Patented Sept. 28, 1943

2,330,667

UNITED STATES PATENT OFFICE 2,330,667

HEAT SET INK

Isidor M. Bernstein, Brooklyn, N. Y., assignor to H. D. Roosen Company, Brooklyn, N. Y., a corporation of New York No Drawing. Application January 12, 1942,
Serial No. 426,469

5 Claims. (Cl. 106—29)

This invention relates to heat set inks of the solvent evaporating type and has for an object to provide a novel and improved ink of the above type and a novel and improved method of making the same.

Various other objects and advantages will be apparent as the nature of the invention is more fully disclosed.

Heat set inks of the solvent evaporating type are commonly made by dispersing a dry pigment, as by grinding on a roller mill, in a vehicle composed essentially of a colloidal solution or sol consisting of a high boiling petroleum fraction as the continuous phase, referred to herein as the solvent and a suitable resinor resinous material as the disperse phase constituting a binder. It has been found, however, that because of the relatively hard crystalline texture of certain dry pigments, such as many of the dry colored pigments, both inorganic and organic, as well as the relatively poor pigment wetting characteristics of the usual heat-set ink vehicle, it is difficult to incorporate the same in the vehicle so as to make a uniform, stable dispersion. On the printing press such inks may exhibit "piling," which is a troublesome condition caused by the separation of the pigment from the vehicle.

It has heretofore been proposed to overcome this difficulty by using the colored pigment in pulp form as in a filterpress cake in which form the pigment exists in a very finely divided state. It has proven difficult, however, in many instances to process the pulp pigment into ink form by the "flushing process," that is, by the preferential wetting of the pigment particles by the vehicle with a consequent release or flushing out of the major portion of the water from the ink mix. Frequently the pigment, vehicle, and all or most of the water originally present form stable emulsions from which the tightly bound, dispersed water phase can be removed only with great difficulty. Such emulsions possess poor ink fluidity and are unsatisfactory in various other respects.

I have discovered that these difficulties are avoided and an easily flushed and uniformly dispersed, stable, heat-set colored ink may be obtained, even from normally poor flushing pulp pigment, by utilizing a plurality of metallic soaps in the vehicle, which soaps together have the property of improving the pigment wetting power of the vehicle and permitting the original water to be readily removed.

Without restricting myself to the following explanation, the above effect may be due to the fact that the metallic soaps, when dissolved to form all or part of the vehicle, lower the interfacial tension of the vehicle with respect to the pigment particle surfaces to a point such that the metallic soaps concentrate at the pigment interfaces in the sol and thereby wet the pigment particles to produce a bond between the resin and the pigment and to displace the water previously held by the pigment.

In accordance with the present invention I have found that the soaps which I term pigment-dispersing agents include two components as follows:

The first component comprises a metal soap containing a metal selected from group 2 of the periodic table such as zinc, calcium, magnesium, barium and strontium or a mixture of the same, which may be present as the rosinate in the normal or basic form, or as the soap of a rosin containing synthetic resin, or of a "run" natural fossil resin, all of which forms are herein referred to for convenience as "resinates." Zinc rosinate, with or without alkaline earth rosinate, is preferred because of its commercial availability.

The second component comprises a metallic soap of lead, manganese, cobalt, cerium or vanadium, which may be in the form of the various drying, semi-drying or non-drying fatty acid soaps. Such soaps may, for example, be made from the following fatty acids: linseed, perilla, soya, cocoanut, castor, oleic or in the form of naphthenic, sec-amylbenzoyl-benzoic, aryl-oxy-acetate and similar organic acids, which can be used to produce metallic soaps which are soluble in the petroleum solvent of the heat-set ink. The soap may also be in the form of resin soaps, such as those made from rosin, rosin-containing synthetic resin or "run" natural fossil resin. It has been found that such soaps are particularly effective when present as the linoleates.

The metallic soaps of the first component may be present in the vehicle in a proportion such as to produce a metal content of 1% to 10%. The soap of the second component may be present in an amount to produce a metal content of .5% to 5%, dependent on the metal combination used and the particular pulp pigment being flushed. The soap resin component may in certain cases constitute all or a part of the binder.

As an example of the effectiveness of the present dispersing agent, the following may be cited: Iron Blue pulp pigment, properly prepared and of fine particle size, forms stable non-flushing emulsions when mixed with ordinary heat-set ink vehicles and even with those containing zinc rosinate as the sole resin binder, from which the water is exceedingly difficult to remove. Twenty to thirty passes over a roller mill are often necessary to evaporate the emulsified water.

On the other hand, when the heat-set ink vehicle contains a combination of metallic soaps, as for example zinc rosinate and lead linoleate in proper proportions, 80% to 90% of the water contained in the iron blue pulp readily and easily flushes out on mixing said vehicle with the pulp pigment in a simple type of mixer, and the remaining water, which is not tightly bound, is readily removed by a few passes over a roller mill. The pigment in the resulting ink is very finely dispersed, as evidenced by microscopic examination. The ink likewise has good fluidity, and has the appearance of being well wetted; that is, a good adhesional bond exists between the pigment and the resin portion of the vehicle. Such an ink performs satisfactorily on a printing press.

The pigment-dispersing agent is suitable for various colored pulp pigments as, for example, tungstated basic dye toners, molybdated basic dye toners, lithol red, lithol rubine, chrome yellow, molybdate orange, and chrome green.

The following are specific examples:

EXAMPLE 1

Heat-set flushed iron blue ink

| Flushing vehicle: | Parts |
|---|---|
| Zinc rosinate (4.8%–10.0% zinc as metal) | 55 |
| Lead linoleate (25% Pb as metal) | 10 |
| Petroleum fraction solvent | 35 |
| Vehicle | 100 |

Heat to dissolve—allow to cool—add in mixer 5–100 parts Iron Blue C. P. or reduced (dry basis) as a 20–40% pulp. Mix—remove water—mill—adjust body with additional solvent.

EXAMPLE 2

Heat-set flushed red ink

| Flushing vehicle: | Parts |
|---|---|
| Barium rosinate (10–18% Ba as metal) | 57 |
| Cobalt soyate (8% Co as metal) | 6 |
| Petroleum fraction solvent | 37 |
| Vehicle | 100 |

Heat to dissolve—allow to cool—add in mixer 5–100 parts Lithol Red toner or lake (dry basis) as 20–40% pulp. Mix—remove water—mill—adjust body with additional solvent.

EXAMPLE 3

Heat-set flushed yellow ink

| Flushing vehicle: | Parts |
|---|---|
| Amerol F-71 (rosin glyceride modified phenolformaldehyde resin) | 20 |
| Zinc rosinate (4.8–10.0% Zn as metal) | 20 |
| Lead rosinate (10–20% Pb as metal) | 25 |
| Petroleum fraction solvent | 35 |
| Vehicle | 100 |

Heat to dissolve—allow to cool—add in mixer 10–300 parts chrome yellow C. P. or reduced (dry basis) as a 50–65% pulp. Mix—remove water—mill—adjust body with additional solvent.

EXAMPLE 4

Heat-set flushed tungstated blue ink

| Flushing vehicle: | Parts |
|---|---|
| Zinc rosinate (4.8%–10.0% Zn as metal) | 35 |
| Calcium rosinate (3–5% Ca as metal) | 20 |
| Lead naphthenate (35–40% Pb as metal) | 5 |
| Manganese naphthenate (8–11% Mn as metal) | 5 |
| Petroleum fraction solvent | 35 |
| | 100 |

Heat to dissolve—allow to cool—add in mixer 5–100 parts tungstated Victoria blue toner or lake (dry basis) as a 12–35% pulp. Mix—remove water—mill—adjust body with additional solvent.

Although certain specific embodiments of the invention have been set forth for purposes of illustration, it is to be understood that the invention is not to be restricted thereto, but that various changes and modifications may be made therein as will be readily apparent to a person skilled in the art. The invention is only to be limited in accordance with the scope of the following claims.

What is claimed is:

1. A heat-set printing ink vehicle comprising a high boiling petroleum fraction containing a pigment dispersing agent dispersed therein, said agent comprising a resinate of a metal selected from group 2 of the periodic table and a metallic soap of a metal selected from the group consisting of lead, manganese, cobalt, cerium and vanadium and of a substance selected from the group consisting of higher fatty acids, and resin acids.

2. A heat-set printing ink vehicle comprising a high boiling petroleum fraction containing a pigment dispersing agent dispersed therein, said agent comprising zinc resinate and lead linoleate.

3. A heat-set printing ink vehicle comprising a high boiling petroleum fraction containing a pigment dispersing agent dispersed therein, said agent comprising a resinate of a metal selected from group 2 of the periodic table and a metallic soap of a metal selected from the group consisting of lead, manganese, cobalt, cerium and vanadium, said first metal being present in the vehicle in the proportion of about 1% to 10%, and said second metal being present in the vehicle in the proportion of about 0.5% to 5.0%.

4. A heat-set printing ink vehicle comprising a high boiling petroleum fraction containing a pigment dispersing agent dispersed therein, said agent comprising zinc resinate and lead linoleate, said zinc and lead being present in the vehicle in the proportion of about 1% to 10% and 0.5% to 5.0% respectively.

5. The method of dispersing pigment particles in waterpulp form in a heat set printing ink vehicle and separating the water therefrom, which comprises incorporating in said vehicle for preferentially wetting said particles, a resinate of a metal selected from group 2 of the periodic table and a metallic soap of a metal selected from the group consisting of lead, manganese, cerium and vanadium and of a substance selected from the group consisting of higher fatty acids and resin acids.

ISIDOR M. BERNSTEIN.